United States Patent [19]
Palan et al.

[11] Patent Number: 5,872,494
[45] Date of Patent: Feb. 16, 1999

[54] LEVEL GAGE WAVEGUIDE PROCESS SEAL HAVING WAVELENGTH-BASED DIMENSIONS

[75] Inventors: Donald Palan, Chaska; Dennis Smith, Minnetonaka; Randall C. Olson, Prior Lake, all of Minn.

[73] Assignee: Rosemount Inc., Eden Prairie, Minn.

[21] Appl. No.: 884,536

[22] Filed: Jun. 27, 1997

[51] Int. Cl.$^6$ .............................. H01P 1/08; G01F 23/284
[52] U.S. Cl. ............................................. 333/252; 342/124
[58] Field of Search ................................... 333/252, 248, 333/254; 342/124

[56] References Cited

U.S. PATENT DOCUMENTS

| | | | |
|---|---|---|---|
| 3,001,160 | 9/1961 | Trousdale | 333/252 |
| 3,593,224 | 7/1971 | Eggers et al. | 333/252 |
| 5,070,730 | 12/1991 | Edvardsson | 342/124 X |
| 5,279,156 | 1/1994 | van der Pol | 333/252 X |
| 5,495,218 | 2/1996 | Erb et al. | 333/248 |
| 5,770,990 | 6/1998 | Lubbers | 333/252 |

FOREIGN PATENT DOCUMENTS

| | | |
|---|---|---|
| 2 187 336 A | 9/1987 | United Kingdom . |
| WO 97/12211 | 3/1997 | WIPO . |

OTHER PUBLICATIONS

"Guiding the way through Micropilot, Reliable microwave level measurement–even under extreme process conditions", *Endress & Hauser Promotion SP 003F/00/e*, Nov. 1993, pp. 1–8.

*Primary Examiner*—Robert Pascal
*Assistant Examiner*—Justin P. Bettendorf
*Attorney, Agent, or Firm*—Westman, Champlin & Kelly, P.A.

[57] ABSTRACT

A waveguide assembly for a process sealed level gage includes first and second waveguide portions, a process sealing cavity and a mechanical barrier. The first waveguide portion has a first waveguide bore. The second waveguide portion is fastened to the first waveguide portion and has a second waveguide bore which is axially aligned with the first waveguide bore for communicating microwave signals at a waveguide wavelength $\lambda_G$ between the waveguide bores. The process sealing cavity is formed at an interface between the first and second waveguide portions. The mechanical barrier includes a first shaft section positioned within the first waveguide portion, a second shaft section positioned within the second waveguide portion and a raised annular shoulder positioned at the interface, within the process sealing cavity. The raised annular shoulder has a width, which is measured radially outward from an outside diameter of the shaft sections, of approximately ½ $\lambda_G$ and a height, which is measured axially between the first and second waveguide portions, of approximately ¼ $\lambda_G$.

15 Claims, 5 Drawing Sheets

LEVEL GAGE WAVEGUIDE PROCESS SEAL HAVING WAVELENGTH-BASED DIMENSIONS

BACKGROUND OF THE INVENTION

The present invention relates to microwave level gages and, in particular, to a microwave level gage having an impedance-matched process seal.

Radar level gages make a non-contacting measurement of the level of products in tanks. The process fluid contained in these tanks range from benign products to severely corrosive or abrasive compounds. The only operating restriction is that the process fluids must have a dielectric constant that is high enough to reflect microwaves which can be received by the radar level gage. Tank environments include a wide range of process temperatures and pressures, and conditions inside the tank are characterized by steam, smoke, dust, mist, foam, condensate, deposits, splashing and turbulence.

The occurrence of these operating conditions are important design considerations for microwave level instrumentation, especially since most level gages sold on the market today are designed to use an antenna which protrudes into the tank. A typical level gage includes an electronics housing, a process connecting flange, a housing-to-flange adapter and an antenna. The housing-to-flange adapter connects the electronics housing to the process connecting flange, and the antenna is connected to the process connecting flange. A waveguide is formed in the housing-to-flange adapter and process connecting flange for providing a microwave signal path between the electronics housing and the antenna.

The process connecting flange and the waveguide inside the process connecting flange and housing-to-flange adapter have to be capable of containing the process pressures in the tanks in order to isolate the gage electronics from the process vapors and liquids. Microwave level gages typically include a process seal which is intended to keep humidity, condensation and process fluids out of the microwave signal transmission path. Moisture or process fluids located in the waveguide area can have the effect of attenuating the microwave signal transmission either by absorbing or reflecting the transmitted energy. The result is either inefficiency or complete loss of signal transmission which leads to failure of the microwave level gage to accurately measure liquid level in the tank. In extreme cases, the microwave level gage will be incapable of detecting liquid level at all.

In the TN Technologies MeasureTech™ RCM microwave level gage, a polytetrafluoroethylene (PTFE) cone-shaped device is used to protect the waveguide from humidity and process fluids. The cone-shape aids in impedance matching for signal transmission and encourages moisture to bead up and drain away from the waveguide-to-antenna transition. In the KROHNE Messtechnik GmbH & Co. KG BM 70 microwave level gage, the waveguide is filled with various low-dielectric materials that are designed for both signal transmission and to protect the waveguide from being filled with process fluids and condensation. The gage incorporates several O-rings and material combinations in compression to make the seal and minimize signal attenuation through the waveguide. The final wetted component of the waveguide assembly is a PTFE, cone-shaped device that performs a similar function as that described for the TN Technologies gage. The Endress & Hauser, GMBH Micropilot FMR 130 microwave level gage has an antenna seal which fills the waveguide portion of the level gage and incorporates O-ring seals to act as a process seal.

A microwave level gage is desired which has a process seal with a smaller number of components, more effective sealing properties and optimized signal transmission characteristics.

SUMMARY OF THE INVENTION

The waveguide assembly of the present invention includes first and second waveguide portions, a process sealing cavity and a mechanical barrier. The first waveguide portion has a first waveguide bore. The second waveguide portion is fastened to the first waveguide portion and has a second waveguide bore which is axially aligned with the first waveguide bore for communicating microwave signals at a waveguide wavelength $\lambda_G$ between the waveguide bores. The process sealing cavity is formed at an interface between the first and second waveguide portions. The mechanical barrier includes a first shaft section positioned within the first waveguide portion, a second shaft section positioned within the second waveguide portion and a raised annular shoulder positioned at the interface, within the process sealing cavity. The raised annular shoulder has a width, which is measured radially outward from an outside diameter of the shaft sections, of approximately ½ $\lambda_G$ and a height, which is measured axially between the first and second waveguide portions, of approximately ¼ $\lambda_G$.

BRIEF DESCRIPTION OF THE DRAWINGS

FIG. 4b is bottom plan view of the spool piece shown in FIG. 4a.

FIG. 5b is an enlarged, fragmentary cross-sectional view of the antenna taken along lines 5b—5b of FIG. 5a.

DETAILED DESCRIPTION OF THE PREFERRED EMBODIMENTS

Figure 1:
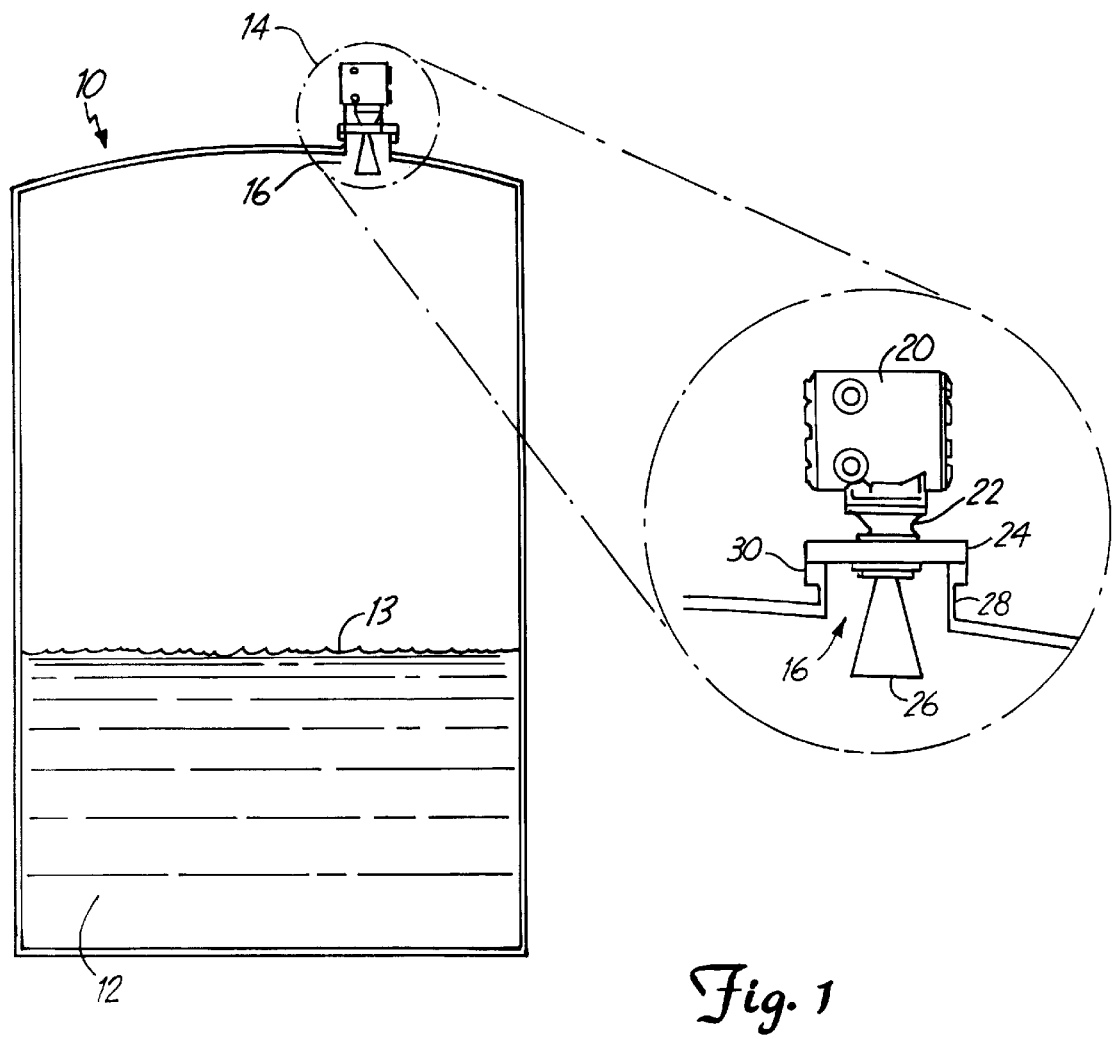
FIG. 1 is schematic representation of a tank in which a microwave level gage is installed according to the present invention.

FIG. 1 is a schematic representation of a process tank 10 in which a microwave level gage assembly is installed according to the present invention. Process tank 10 is filled with a liquid 12, the height or level 13 of which is to be determined by microwave level gage assembly 14. Level gage assembly 14 is mounted on a tank port 16 at the top of tank, and is sealed relative to the tank. Microwave level gage assembly 14 transmits microwave energy along the waveguide, through port 16 and receives reflected energy from liquid surface 13 to provide an indication of the level of the liquid within the tank.

Microwave level gage assembly 14 includes electronics housing 20, housing-to-flange adapter 22, process connecting flange 24 and antenna 26. Assembly 14 is mounted to a stand off pipe 28 which is fastened to the top of tank 10, around port 16. Tank flange 30 is fastened to standoff pipe 28. Process connecting flange 24 is secured with bolts to tank flange 30 and is sealed with a suitable gasket. Process connecting flange 24 supports both adapter 22 and electronics housing 20.

Figure 2:
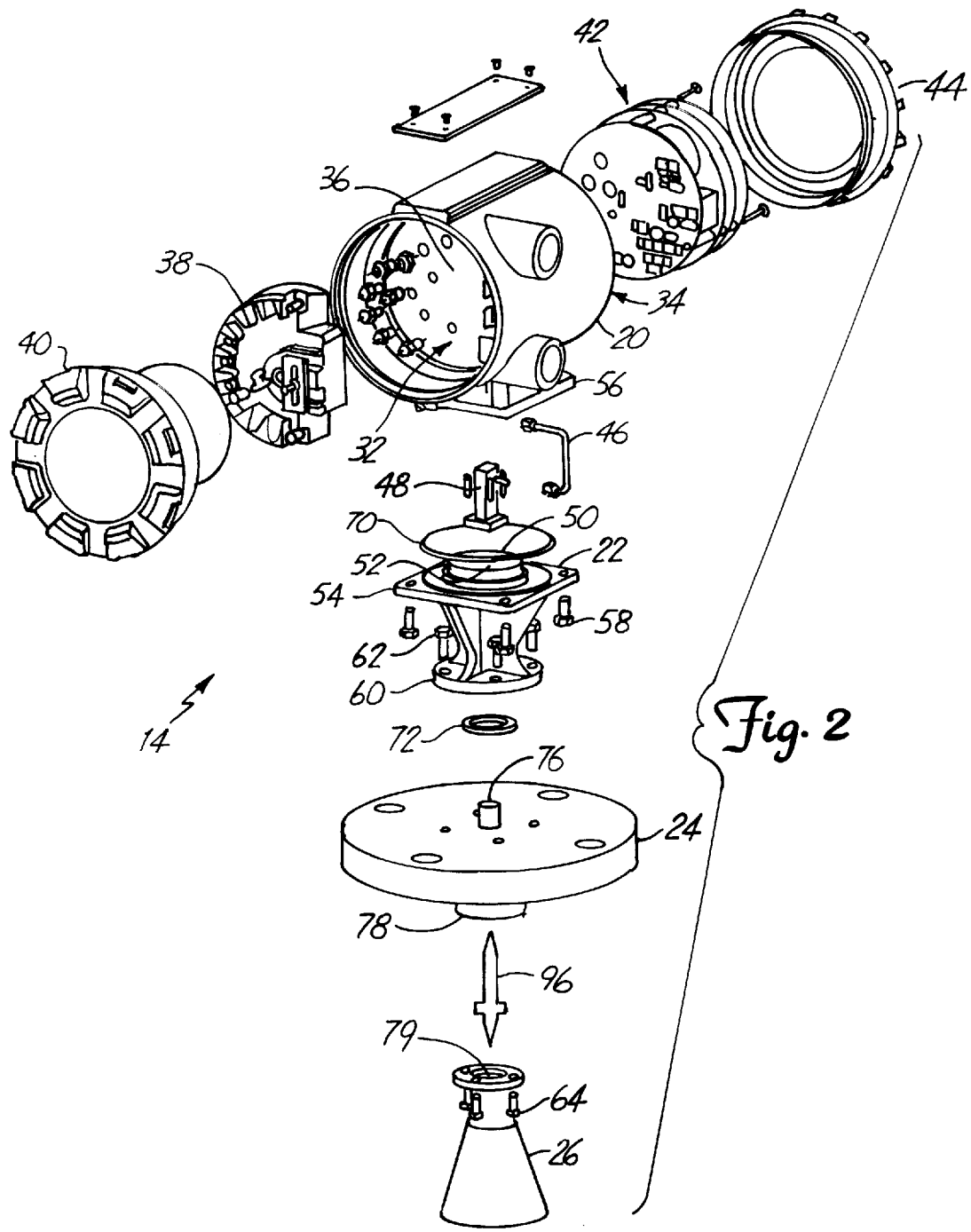
FIG. 2 is an exploded perspective view of the microwave level gage shown in FIG. 1.

FIG. 2 is an exploded perspective view of level gage assembly 14. Electronics housing 20 includes a terminal compartment 32 and an electronics compartment 34 which are separated by a bulk head 36. A terminal block 38 is mounted within terminal compartment 32 for providing external electrical connections to the electronics within electronics compartment 34. The external electrical connections are used to couple assembly 14 to a process control link, such as two or four wire process control loop or a process control bus over which assembly 14 receives power and signal information and transmits level information and other status information. A cover 40 is threaded into terminal compartment 32 for sealing the terminal compartment with respect to the outside environment. The electronics that are used for transmitting microwave energy, receiving the reflections and for making sensor calculations are provided on a stack of printed circuit boards 42 which are mounted within electronics compartment 34. The electronics are well known in the industry. A cover 44 is threaded into electronics compartment 34 for sealing the electronics compartment with respect to the outside environment.

The electronics provide microwave energy through a coaxial connection 46 which is coupled to a coax-to-rectangular waveguide adapter 48, positioned within electronics housing 20. The coax-to-rectangular waveguide adapter 48 is secured with screws to a raised boss 50 of housing-to-flange adapter 22. A waveguide bore 52 extends though adapter 22 for transmitting the microwave energy to and from coax-to-rectangular waveguide adapter 48. Adapter 22 includes mounting plate 54 which is secured to a lower housing flange 56 of electronics housing 20 with bolts 58. Adapter 22 also includes mounting plate 60, which is secured to process connecting flange 24 with bolts 62. Spool piece 78 extends through process connecting flange 24 and has a waveguide bore 76 which is axially aligned with waveguide bore 52. Process connecting flange 24 and spool piece 78 together form a process connecting flange assembly.

Antenna 26 is secured to a lower surface of spool piece 78 with bolts 64. Antenna 26 includes a central waveguide bore or aperture 79 which aligns with waveguide bore 52 in adapter 22 and waveguide bore 76 in spool piece 78. In the embodiment shown in FIG. 2, antenna 26 includes a conically shaped antenna. However, the present invention can be used as a "stick" antenna. Mechanical barrier 96 is inserted within waveguide bores 76 and 79 and forms a process seal which seals the waveguides and the electronics within housing 20 from process pressures and materials in tank 10.

Figure 3:
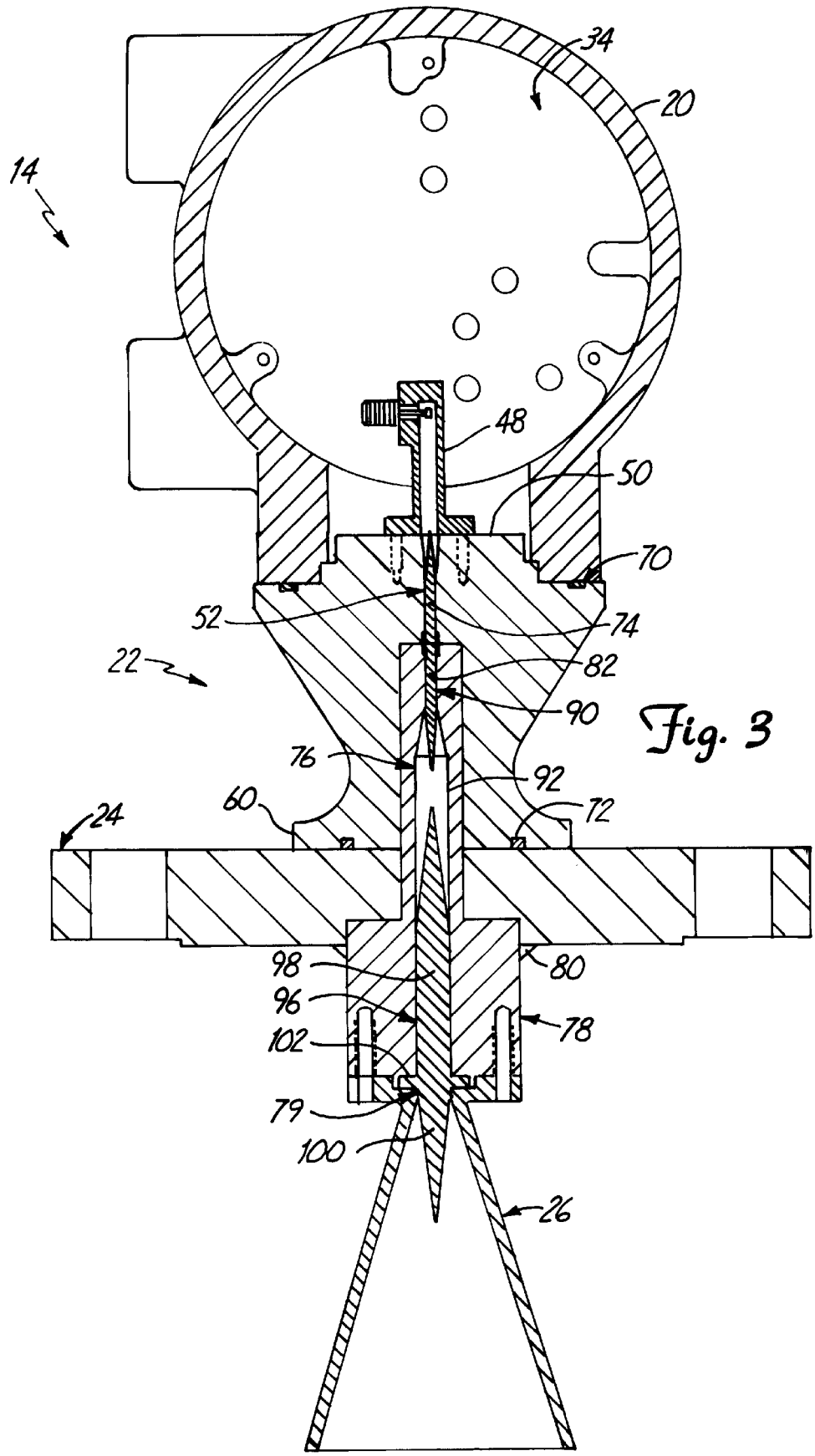
FIG. 3 is a cross-sectional view of the microwave level gage in an assembled state.

FIG. 3 is a cross-sectional view of level gage assembly 14 in an assembled state. As shown in FIG. 3, coax-to-rectangular waveguide adapter 48 is mounted to boss 50 of adapter 22 and extends within electronics compartment 34 of housing 20. Waveguide adapter 48 can include a variety of waveguides and, in one embodiment, includes an RA42SMA-F1A-A model waveguide which is available from Continental Microwave. An O-ring 70 sits within an annular recess in mounting plate 54 for sealing the adapter plate to housing 20. Similarly, a high temperature gasket 72 sits within an annular recess in mounting plate 60 for sealing the mounting plate to process connecting flange 24.

Adapter 22 is preferably formed of a non-magnetic material having poor thermal conductivity, strong structural characteristics and high resistance to corrosion, such as stainless steel. Waveguide bore 52 in adapter 22 is axially aligned with coax-to-rectangular adapter 48. A mechanical barrier 74 is positioned within waveguide bore 52, which fills the waveguide and has a long pointed conically-shaped end adjacent adapter 48 for impedance matching. In one embodiment, the length of the transition is twice the wavelength of the microwave signals transmitted through waveguide bore 52. However, this length can be significantly shortened if verified through testing. Typically, the transition length will be shortened to meet mechanical and manufacturing objectives, including the ability of the mechanical barrier to resist breakage. For example, a successful transition length can be on the order of one waveguide wavelength.

Mechanical barrier 74 preferably has a low dielectric constant over the operating temperature and frequency ranges of the gage. The dielectric constant is preferably consistent from manufacturing to manufacturing so that variations in waveguide performance are minimized from gage to gage. Additionally, the material used for 74 mechanical barrier 74 should be readily available, easy to machine or process and should have good temperature and pressure performance. Materials used for mechanical barrier 74 include polytetrafluoroethylene, various thermal plastics, quartz, and selected types of ceramic materials.

Spool piece 78 is welded to process connecting flange 24 at welds 80 and extends partially within adapter 22. Waveguide bore 76 extends through spool piece 78 and is axially aligned with waveguide bore 52 in adapter 22. The primary design concerns for waveguide bores 52 and 76 include concerns over the cutoff frequency of the waveguide, controlling the waveguide dimensions to limit the modes of microwave transmission only to the dominate or principal transmission modes, and avoiding or minimizing waveguide imperfections and impedance transitions that contribute to losses due to reflections and resonance. In the embodiment shown in FIG. 3, waveguide bore 76 has circular cross section for ease of manufacturing, use of concentricity and a tolerance control that can be maintained. However, waveguide bore 76 can have many different shapes, such as square or rectangular.

Waveguide bore 76 includes sections 90 and 92. Section 90 has a relatively small diameter which matches the diameter of waveguide bore 52. Section 90 transitions gradually to section 92, which has a larger diameter. Determination of the waveguide bore diameter is based on the operating frequency range of the gage, the dielectric constant of materials in the bore and the cutting off of higher order modes of microwave transmission. These factors are combined with standard microwave equations to calculate the minimum and maximum and waveguide diameters such that only the desired operating frequency and transmission mode for gage are possible.

Mechanical barrier 82 is positioned within section 90 of waveguide bore 76 and abuts mechanical barrier 74. Mechanical barrier 82 has a conically-shaped lower end for impedance matching at the transition to section 92. Mechanical barrier 82 is preferably formed of the same material as barrier 74.

Mechanical barrier 96 is positioned within section 92 of waveguide bore 76 and extends into waveguide bore 79 of antenna 26, which is secured to a lower surface of spool piece 78. Mechanical barrier 96 includes an elongated shaft with a first shaft section 98 positioned within section 92 of waveguide bore 76 and a second shaft section 100 positioned within waveguide bore 79 of antenna 26. Mechanical barrier 96 has a raised annular shoulder 102 which extends radially from the outer diameters of shaft sections 98 and 100 and is compressed between spool piece 78 and antenna 26. Shoulder 102 provides a process seal which seals waveguide bores 76 and 52, coax-to-rectangular adapter 48, and the electronics within housing 34 from the process material and process pressures within tank 10. In a preferred embodiment, shaft sections 98 and 100 and shoulder 102 are formed of a single, continuous piece of material. This minimizes transitions from one section of the barrier to the next, which minimized microwave reflections and other transmission inefficiencies or losses.

To improve the process seal, shafts 98 and 100 are dimensioned slightly greater than the diameters of waveguide bores 96 and 94, respectively, and are cooled before insertion into the waveguide bores so that a long compression joint is formed along the waveguide bores. Also, raised annular shoulder 102 has a height measured axially between spool piece 78 and antenna 26 which is slightly greater than the height of a sealing cavity formed between spool piece 78 and antenna 26 so that the shoulder is compressed during assembly. In addition, shoulder 102 has a width measured radially outward from an outer diameter of shaft sections 98 and 100 which is slightly smaller in diameter than the sealing cavity. During assembly, the material of shoulder 102 "flows" into the cavity and forms the seal.

The height and width of raised annular shoulder 102 are selected to be compatible with microwave signal transmission. Specifically, the height or thickness of shoulder 102, measured axially between spool piece 78 and antenna 26, is approximately ¼ the microwave signal transmission waveguide wavelength $\lambda_G$ through section 92 of waveguide bore 76. The width of annular shoulder 102, measured radially from the outer diameter of shaft sections 98 and 100, is approximately ½ $\lambda_G$.

The microwave waveguide design constraints for the working frequency and power output of the gage are thus also incorporated into the process seal, which is characterized by impedance and impedance matching. The dimensions and structure of the seal and the overall mechanical barrier 96 minimize reflections, resonance and introduction of higher order transmission modes. This minimizes inefficiencies, losses and false target returns that the microwave level gage may or may not be able to tolerate.

There are two primary advances in technology that enable the use of this type of waveguide process seal. First, microwave electronics are now cable of operating at 24 GHz which is more than twice as high the operating frequencies of contemporary level gages. This reduces the cross-sectional area of the waveguide and the process seal (either circular or rectangular) that is required for microwave propagation. This reduction in size allows the process seal to be physically small, manufacturable and reasonably cost effective. Secondly, advances in copolymers, thermal plastics and ceramics in recent years has increased the availability and quality of high temperature, low dielectric, low loss tangent materials for the construction of mechanical barriers 74, 82 and 96.

Figure 4A:
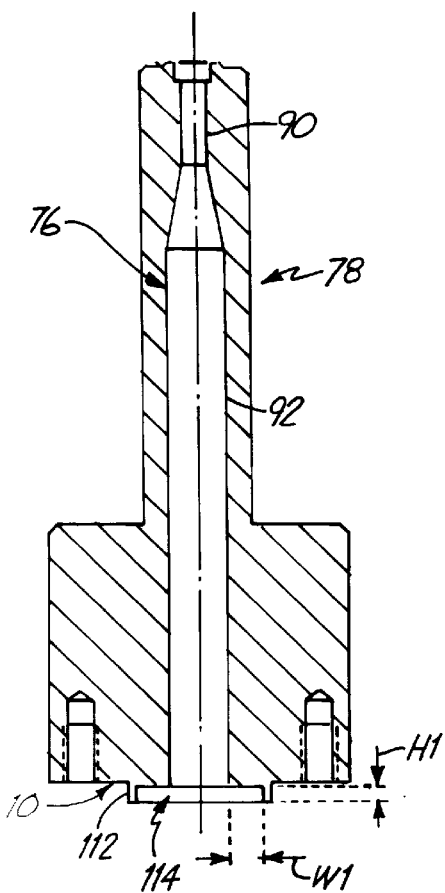
FIG. 4a is a cross-sectional view of a spool piece shown in FIGS. 1–3.

FIG. 4a is cross-sectional view of spool piece 78 which shows the process sealing cavity in greater detail. Spool piece 78 has a mounting face 110 at the interface with antenna 26. Mounting face 110 includes a raised annular boss 112 which partially defines sealing cavity 114. Sealing cavity 114 has a height H1 and a width W1. Height H1 is measured in an axial direction, while width W1 is measured in a radial direction from an outer diameter of section 92 of waveguide bore to an inside diameter of raised annular boss 112.

Figure 4B:
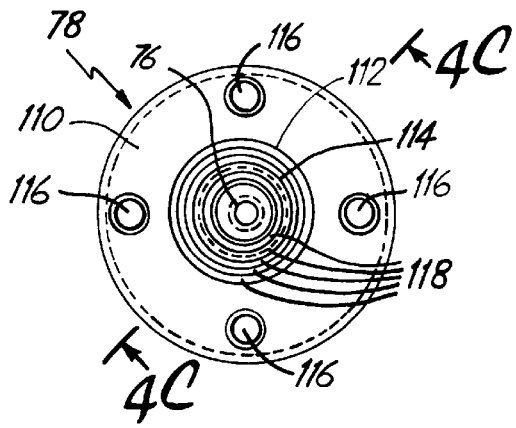
Figure 4C:
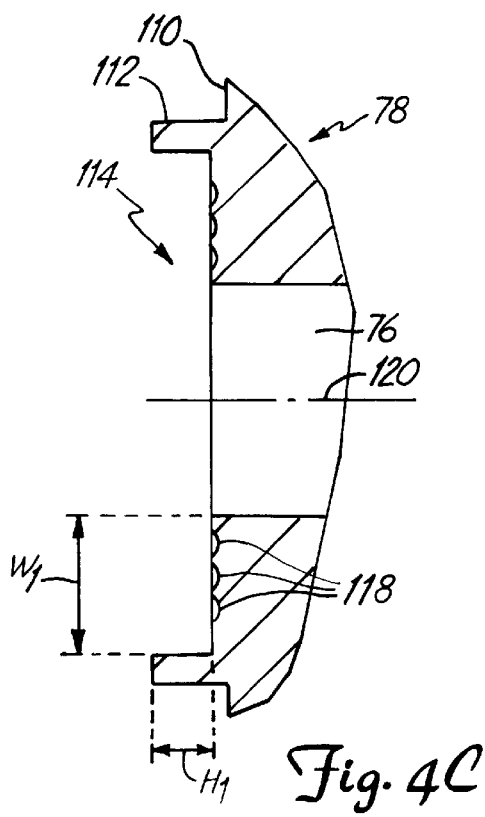
FIG. 4c is an enlarged, fragmentary cross-sectional view of the spool piece taken along lines 4c—4c of FIG. 4b.

FIG. 4b is a bottom plan view of spool piece 78, as viewed from mounting face 110. Mounting face 110 has a plurality of threaded holes 116 which receive bolts 64 for fastening antenna 26 to mounting face 110. Process sealing cavity 114 is surrounded by raised annular bore 112. Mounting face 110 also has a plurality of serrations 118 within sealing cavity 114. Serrations 118 are shown in greater detail in FIG. 4c, which is an enlarged, fragmentary, sectional view of spool piece 78 taken along lines 4c—4c of FIG. 4b. Serrations 118 provide crevices for the material of shoulder 102 (shown in FIG. 3) to flow into, which further increases the sealing capability of the process seal. When shoulder 102 is compressed axially along axis 120 within sealing cavity 114, the material of shoulder 102 flows into serrations 118. Differences in the coefficients of thermal expansion between mechanical barrier 96 and spool piece 78 cause the mechanical barrier to expand and contract to a greater degree than the spool piece. With a decrease in temperature, shoulder 102 contracts radially relative to spool piece, and the material of shoulder 102 presses against the inner diameter of serrations 118 relative to axis 120 to maintain integrity of the process seal. Similarly, with an increase in temperature, shoulder 120 expands radially relative to spool piece 78, and the material of shoulder 102 presses against the outer diameter of serrations 118 to maintain the integrity of the process seal.

Figure 5A:
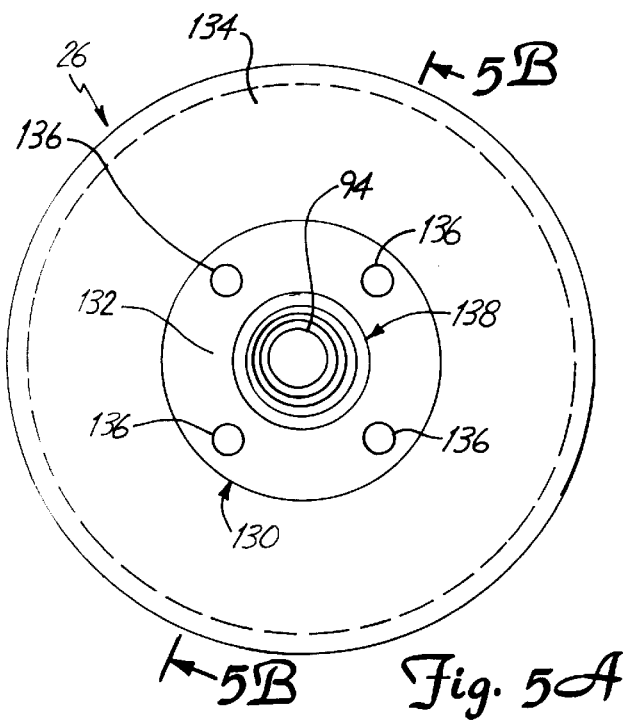
FIG. 5a is a top plan view of an antenna in the microwave level gage shown in FIGS. 1–3.
Figure 5B:
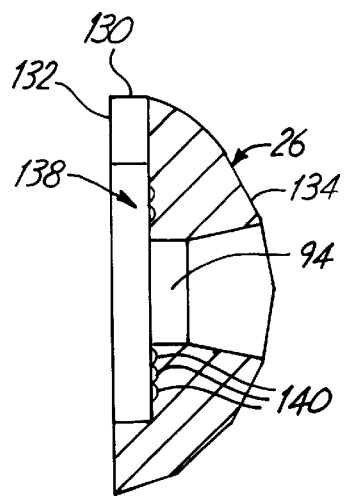

FIG. 5a is a plan view of antenna 26, as viewed from the interface with spool piece 78. Antenna 26 includes a flange 130 which forms a mounting face 132 for attachment to mounting face 110 of spool piece 78. Antenna body 134 is attached to and supported by flange 130. Mounting face 132 includes a plurality of screw holes 136 and a cavity 138. Screw holes 136 mate with threaded screw holes 116 in spool piece 78 (shown in FIG. 4b). When antenna 26 is attached to spool piece 78, cavity 138 receives raised annular boss 112 (as shown in FIG. 3), thereby defining process sealing cavity 114. Cavity 138 further includes a plurality of serrations 140 which are similar to serrations 118 in spool piece 78. Serrations 140 are shown in greater detail in FIG. 5b, which is an enlarged, fragmentary, sectional view of antenna 26 taken along lines 5b—5b of FIG. 5a. Serrations 140 perform a similar function as serrations 118 against an opposite face of shoulder 102 (shown in FIG. 3).

Figure 6:
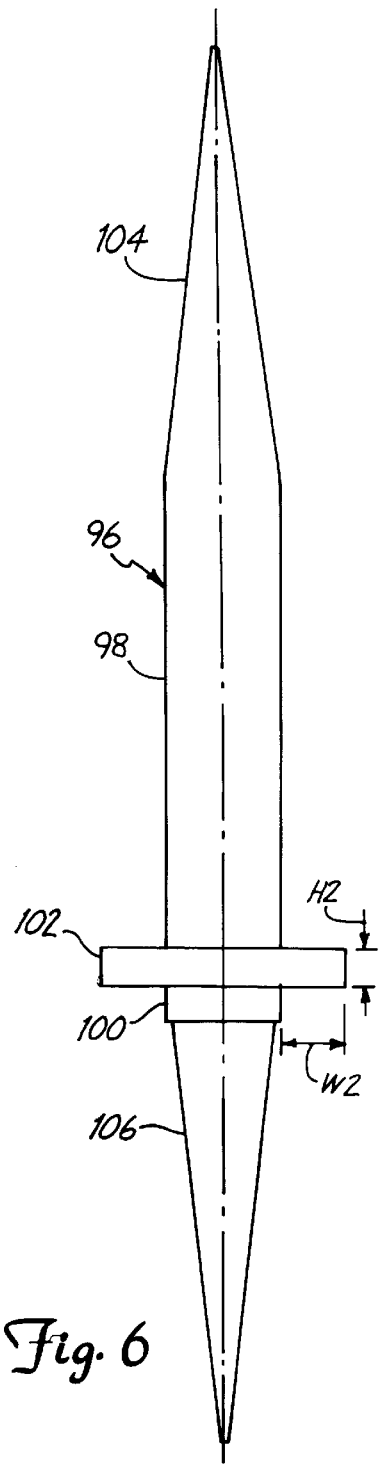
FIG. 6 is a side plan view of a mechanical barrier used in the microwave level gage shown in FIGS. 1–3.

FIG. 6 is an enlarged, side plan view of mechanical barrier 96. Mechanical barrier 96 includes shaft sections 98 and 100, raised annular shoulder 102 and conically-shaped transition sections 104 and 106. As discussed above, shaft sections 98 and 100 and raised annular shoulder 102 are formed of a singular continuous piece of material. In alternative embodiments, shaft sections 198 and 100 and raised annular shoulder 102 are formed of separate pieces of material which are abutted to one another. Shoulder 102 has a height H2 which is slightly greater, such as 10–20 percent greater, than the height H1 of process sealing cavity 114 (shown in FIGS. 4a and 4b) and a width W2 which is slightly smaller, such as 10–20 percent smaller than the width W1 of process sealing cavity 114. Height H2 and width W2 are dimensioned such that when shoulder 102 is compressed between spool piece 78 and antenna 26, height H2 is compressed to approximately ¼ $\lambda_G$ and width W2 is expanded to approximately ½ $\lambda_G$, and shoulder 102 substantially fills the volume of cavity 114.

The microwave level gage of the present invention has a waveguide barrier and process seal which incorporate ¼ and ½ waveguide wavelength stepped geometry to minimize impedance transitions, reflections, resonance and introduction of higher order transmission modes while maintaining a robust process seal.

Although the present invention has been described with reference to preferred embodiments, workers skilled in the art will recognize that changes may be made in form and detail without departing from the spirit and scope of the invention.

What is claimed is:

1. A waveguide assembly for use in a process sealed level gage, the waveguide assembly comprising:
   a first waveguide portion having a first waveguide bore;
   a second waveguide portion fastened to the first waveguide portion and having a second waveguide bore which is axially aligned with the first waveguide bore and which communicates microwave signals at a waveguide wavelength $\lambda_G$;
   a process sealing cavity formed at an interface between the first and second waveguide portions; and
   a mechanical barrier comprising a first shaft section positioned within the first waveguide portion, a second shaft section positioned within the second waveguide portion and a raised annular shoulder positioned within the process sealing cavity, the raised annular shoulder having a width extending radially outward from an outer diameter of the shaft sections approximately ½ $\lambda_G$ and a height extending axially between the first and second waveguide portions approximately ¼ $\lambda_G$.

2. The waveguide assembly of claim 1 wherein:
   the process sealing cavity has a height measured between the first and second waveguide portions and a width measured radially outward from an outer diameter of the first and second waveguide bores;
   the raised annular shoulder has an uncompressed state prior to assembly in which the width of the shoulder is less than the width of the process sealing cavity and the height of the shoulder is greater than the height of the process sealing cavity; and
   the raised annular shoulder is compressed axially in the process sealing cavity between the first and second waveguide portions after assembly to form a process seal in which the raised annular shoulder fills the process sealing cavity.

3. The waveguide assembly of claim 2 wherein the width of the shoulder is ½ $\lambda_G$ and height of the shoulder is ¼ $\lambda_G$ when the shoulder is in the compressed state after assembly.

4. The waveguide assembly of claim 1 wherein the first waveguide portion comprises a microwave antenna having a mounting face with a recess which partially defines the process sealing cavity.

5. The waveguide assembly of claim 1 wherein the second waveguide portion comprises a process connecting flange assembly having a mounting face with a raised annular boss which partially defines the process sealing cavity.

6. The waveguide assembly of claim 1 wherein the first shaft section, the second shaft section and the raised annular shoulder are formed of a single, continuous piece of dielectric material.

7. The waveguide assembly of claim 1 wherein the mechanic barrier is formed of polytetrafluoroethylene (PTFE).

8. The waveguide assembly of claim 1 wherein:
   the process sealing cavity has a first sealing surface formed on the first waveguide portion and a second sealing surface formed on the second sealing surface; and
   at least one of the first and second sealing surfaces comprises a plurality of serrations which define crevices for the raised annular shoulder to flow into when compressed between the sealing surfaces.

9. A waveguide assembly for use in a process sealed level gage, the waveguide assembly comprising:
   a first waveguide portion having a first dielectric-filled waveguide bore with an outer waveguide diameter;
   a second waveguide portion fastened to the first waveguide portion and having a second dielectric-filled waveguide bore which is axially aligned with the first dielectric waveguide bore and which communicates microwave signals at a waveguide wavelength $\lambda_G$;
   a process sealing cavity formed at an interface between the first and second waveguide portions; and
   a process seal positioned within the process sealing cavity and extending radially outward from the outer waveguide diameter approximately ½ $\lambda_G$ and extending axially approximately ¼ $\lambda_G$.

10. The waveguide assembly of claim 9 wherein:
    the first waveguide portion is filled with a first dielectric mechanical barrier;
    the second waveguide portion is filled with a second dielectric mechanical barrier; and
    the first and second dielectric mechanical barriers and the process seal are formed of a single, continuous piece of material.

11. A mechanical barrier for sealing a waveguide in an microwave level gage, wherein the waveguide transmits microwave signals having a waveguide wavelength $\lambda_G$ in the waveguide, the mechanical barrier comprising:
    an elongated shaft having an outer diameter which is sized to substantially fill the waveguide; and
    a process sealing shoulder positioned along the shaft for axial compression in the waveguide and having a width extending radially outward from the outer diameter approximately ½ $\lambda_G$ and a height extending axially along the shaft approximately ¼ $\lambda_G$.

12. The mechanical barrier of claim 11 wherein the width and height of the shoulder are sized to be ½ $\lambda_G$ and ¼ $\lambda_G$, respectively, when compressed in the waveguide.

13. The mechanical barrier of claim 11 wherein the width is 10–20 percent less than ½ $\lambda_G$ when uncompressed in the waveguide.

14. The mechanical barrier of claim 11 wherein the height is 10–20 percent greater than ¼ $\lambda_G$ when uncompressed in the waveguide.

15. A method of mechanically sealing a waveguide in a process sealed level gage, wherein the waveguide includes a first waveguide portion having a first waveguide bore and a second waveguide portion having a second waveguide bore and wherein the first and second waveguide bores communicate microwave signals at a waveguide wavelength $\lambda_G$, the method comprising:
    axially aligning the first waveguide bore with the second waveguide bore;
    inserting a process seal into at least one of the first and second waveguide bores, the process seal comprising a raised annular shoulder having a width extending radially outward from an outer diameter of the bore and having a height extending axially between the first and second waveguide portions; and
    fastening the first waveguide portion to the second waveguide portion such that the raised annular shoulder is axially compressed between the first and second waveguide portions until the width is approximately ½ $\lambda_G$ and the height is approximately ¼ $\lambda_G$.

* * * * *